Patented June 1, 1937

2,082,545

UNITED STATES PATENT OFFICE 2,082,545

METHOD OF MIXING

Evald C. Ljungberg, Worcester, Mass., assignor to Norton Company, Worcester, Mass., a corporation of Massachusetts No Drawing. Application February 16, 1937, Serial No. 126,021

5 Claims. (Cl. 51—278)

The invention relates to a method of mixing abrasive grain and bond. The present application is a continuation in part of my application Serial No. 64,440 filed February 18, 1936.

One object of the invention is to provide an improved method of mixing abrasive grain and ceramic bond. Another object of the invention is to provide an improved method for the manufacture of a vitrified grinding wheel. Another object of the invention is to provide an improved grinding wheel or other abrasive body. Another object of the invention is to obtain a plastic mixture of uniform consistency. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

A mixing machine is adapted to rotate and divert abrasive grain, the diversion causing the grain to flow back upon itself and stirring it thoroughly so that, when an additional ingredient is added a thorough dispersion of one ingredient in the other is achieved and thereby a thorough mixing. I desire to coat each abrasive grain or granule of a given quantity of abrasive grain with a layer of adhering bond which is plastic so that a pressed wheel can be formed of uniform consistency in order that the ultimate grinding wheel or other abrasive body shall have a uniform or balanced structure avoiding the formation of lumps or clusters. Any mixing machine capable of causing thorough dispersion of a powdered material in a grain material, such as abrasive grain for example, may be used. I desire to achieve more than a mere dispersion of the bond in the abrasive grain; I desire to cause a bond, for example powdered bond, to be made plastic and to stick to the individual grains so that each grain shall have some bond stuck thereto and evenly distributed over its total surface and, assuming each individual granule or grain to be of the same approximate size, each having the same weight of bond within limits. That is to say, assuming the abrasive grain to vary between the limits of 30 mesh size and 40 mesh size, the average being 35 mesh size, there shall be the same amount of bond on each granule after the mixing is effected within the limits of plus 50% or minus 40% and furthermore there shall be no loose bond unattached to a granule to any appreciable extent remaining in the entire mass. Considering now the mixing of abrasive grain and bond, and more specifically abrasive grain and ceramic bond to produce a vitrified grinding wheel or other abrasive body, I provide a measured quantity of emery, corundum, or artificially fused alumina; or silicon carbide as produced in the electric furnace. Other abrasive substances may be used, such as garnet, silica, or diamond, or any of the hard carbides such as tungsten or tantalum carbide or boron carbide. The abrasive grain may be in one or a plurality of grain sizes but preferably the grain size is controlled within reasonable limits. I place a quantity of such abrasive grain in a mixing machine of any type, many mixing machines being now on the market. Most mixing machines are rotary or have a rotary element of some kind and the action consists in circulating the material to be mixed in some sort of a path and causing irregularity of flow in some manner to distribute or disperse a series of individual particles which may be together when placed in the mixer among the other particles so that they are widely separated after mixing. Any machine which will stir or mix and distribute or disperse material in itself, that is to say cause a clump of individual particles to be separated, may be used for carrying out the method of the invention.

Having placed a definite amount of abrasive grain in the mixing machine, I start the mixing machine in operation and add a measured quantity of powdered dextrin to the abrasive grain. Dextrin is a soluble gummy substance having an adhesive action, and other similar substances for plasticizing the mixture may be substituted. Dextrin comes in powdered form and, according to the method of the present invention, I prefer to add the dextrin to the grain in a mass, that is to say by dumping it in in order to save time. Continuing mixing as described, the dextrin is quickly dispersed throughout the mass of abrasive grain and in the average case one minute will suffice to distribute the dextrin throughout the mass of abrasive grain. I now add water in a measured amount, continuing the mixing. Water may be added in a broad stream or from a container. I continue the mixing for a short time after adding the water but usually thirty seconds or less will suffice to distribute the water throughout the mass so that every abrasive grain is wet. The water wets the dextrin and takes it into solution, which solution is a sticky solution, and thereupon each abrasive grain is coated with some of the sticky liquid and, if the proportions are correctly chosen, there is no liquid unattached to abrasive grain. A typical example of the proportions of substances used so far is 250 pounds of abrasive grain, 4 pounds of water, and 1.5 pounds of dextrin.

I now add bond, for example in the amount of 44 pounds corresponding to the example above given. This bond is sifted into the mixer while it is operating and while the mixing is continued. Any hand sieve or machine sieve may be employed. Sieving of bond continues until all the bond is introduced into the mixture and thereafter mixing continues for a short time. Usually three minutes will suffice to introduce the bond and three minutes more will suffice to complete the mixing.

The bond may be of any type which with abrasive grain will make a grinding wheel, and which may be plasticized with water and dextrin or other similar substance. Particularly I refer to ceramic bonds which, after vitrification, form a glassy or porcelain bond holding the abrasive grains together in a grinding wheel. Such is the efficiency of mixing according to the apparatus described that after six minutes of mixing, three while the bond was being introduced and three after all the bond was introduced, each abrasive grain is coated with bond and there is no bond loose in the material. Furthermore, as already stated, the amount of ceramic bond on each abrasive grain is the same within limits. The bond and the sticky liquid formed by the water and the dextrin mix together into a homogeneous plastic mass and each abrasive grain has all sides and portions thereof coated with the plasticized bond to approximately a uniform depth excepting at the corners of the grain, abrasive grain being normally quite irregular in shape. Using artificial alumina grain, which is chunky, each more or less plane face thereof has bond on it to a practically uniform depth within reasonable limits.

Taking a mixture prepared as herein described, I place it in a suitable mold, apply pressure, strip the mold and there is produced a uniform wheel shape consisting of abrasive grain and ceramic bond. A wheel so produced is characterized by lack of lumpy spots or chunks of abrasive grain stuck together in clusters without porosity. Stating it positively, there is some pore space between each three grains stuck together and the bond is uniformly distributed in bond posts joining the several grains. In other words the structure is uniform and in balance. The shaped wheel so produced may now be taken to a suitable kiln and fired at the temperature for firing vitrified grinding wheels, for example at or around 1300° C. The final result is a grinding wheel of uniform structure and consistency throughout and because of this, adequate strength.

It will thus be seen that there has been provided by this invention a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. A method of coating abrasive grain with ceramic bond which comprises mixing a mass of grain, adding a plasticizer in powdered form, continuing the mixing, adding water, continuing the mixing, adding powdered ceramic bond by sifting, and continuing the mixing until each grain is coated with a substantially uniform amount of ceramic bond and there is no ceramic bond unattached to grain.

2. A method of manufacture of a vitrified grinding wheel which consists in providing a quantity of abrasive grain, adding a powdered plasticizer to the grain, thoroughly mixing the grain and plasticizer so that the plasticizer is dispersed throughout the mass of grain, adding water, continuing the mixing until each grain is coated with the sticky liquid comprising water and dissolved plasticizer, adding ceramic bond in a shower, continuing the mixing during the addition of ceramic bond and thereafter for a short time until each abrasive grain is coated with a layer of ceramic bond which is plasticized by the water and plasticizer, placing the mixture in a mold, pressing into the form of a wheel, and firing at a vitrifying temperature.

3. A method of making a grinding wheel or other abrasive or refractory product which comprises providing a quantity of abrasive grain, adding thereto a quantity of plasticizer in powdered form, distributing the plasticizer throughout the mass of abrasive grain, adding a quantity of water, mixing the mixture, adding a quantity of powdered ceramic bond, mixing the mixture, placing the thus formed mixture in a mold, pressing and firing at a vitrifying temperature.

4. A method of coating abrasive grain with ceramic bond which comprises placing grain in a mixing machine, at the same time or thereafter adding a plasticizer in powdered form and circulating the plasticizer through and among the abrasive grains to distribute it evenly among the abrasive grains, then adding water, continuing the circulation to distribute the water evenly through the mass of abrasive grains and plasticizer, adding ceramic bond in a shower while continuing the circulation to disperse the bond and continuing such dispersion after the bond is added until some bond covers every side of every individual abrasive grain and there is no loose bond.

5. A method of making an abrasive body which consists in proceeding according to claim 4, placing the mixture in a mold, pressing and then firing at a vitrifying temperature.

EVALD C. LJUNGBERG.